(12) United States Patent
Franklin et al.

(10) Patent No.: US 7,052,727 B2
(45) Date of Patent: May 30, 2006

(54) ASSEMBLY AND METHOD FOR FORMING A FROZEN CONFECTION

(75) Inventors: Peter B. Franklin, Concord, MA (US); Arthur L. Darcy, Sciluate, MA (US)

(73) Assignee: Cool Dog, Inc., Shirley, MA (US)

( * ) Notice: Subject to any disclaimer, the term of this patent is extended or adjusted under 35 U.S.C. 154(b) by 149 days.

(21) Appl. No.: 10/468,068

(22) PCT Filed: Feb. 15, 2002

(86) PCT No.: PCT/US02/01966

§ 371 (c)(1),
(2), (4) Date: Jun. 7, 2004

(87) PCT Pub. No.: WO02/069730

PCT Pub. Date: Sep. 12, 2002

(65) Prior Publication Data
US 2004/0234642 A1  Nov. 25, 2004

Related U.S. Application Data

(60) Provisional application No. 60/273,145, filed on Mar. 3, 2001.

(51) Int. Cl.
*A23G 9/28* (2006.01)
*A23P 1/00* (2006.01)

(52) U.S. Cl. .................. 426/389; 426/393; 426/414; 425/122; 425/296; 425/301

(58) Field of Classification Search ............... 425/122, 425/296, 301; 426/389, 393, 414; 53/122, 53/514, 518, 520, 528
See application file for complete search history.

(56) References Cited

U.S. PATENT DOCUMENTS

| | | | | | |
|---|---|---|---|---|---|
| 2,563,278 | A | * | 8/1951 | Rummel et al. | 426/393 |
| 2,685,769 | A | * | 8/1954 | Conti | 53/122 |
| 2,816,837 | A | * | 12/1957 | Holsman | 426/412 |
| 4,044,425 | A | * | 8/1977 | Nausedas | 452/45 |
| 4,413,461 | A | * | 11/1983 | Waldstrom | 53/122 |
| 4,762,483 | A | * | 8/1988 | Zevlakis | 425/140 |
| 5,182,128 | A | * | 1/1993 | Laplace | 426/410 |
| 5,281,429 | A | * | 1/1994 | Zevlakis | 426/389 |

* cited by examiner

*Primary Examiner*—Robert B. Davis
(74) *Attorney, Agent, or Firm*—Pandiscio & Pandiscio

(57) ABSTRACT

An assembly and method for forming a frozen confection portion of a frozen confection type food product, the assembly comprising a mold assembly provided with a mold cavity of a selected configuration ad formed by a flexible inert casing, a pump for moving confection into the mold cavity and casing to fill the mold cavity and casing, sealing means for sealing the ends of the casing to provide a link of confection, a cutter device for separating the link from adjoining links, freezing devices for receiving and further freezing the link, and apparatus for opening the casing of the link and permitting the frozen confection to exit out of the casing in the selected configuration.

21 Claims, 2 Drawing Sheets

ASSEMBLY AND METHOD FOR FORMING A FROZEN CONFECTION

CROSS-REFERENCE TO RELATED APPLICATION

This application claims the benefit of and is a continuation in part of U.S. Provisional Patent Application Ser. No. 60/273,145, filed Mar. 3, 2001, in the names of Peter B. Franklin et al.

BACKGROUND OF THE INVENTION

1. Field of the Invention

This invention relates to ice cream novelties, and the like, and is directed more particularly to an assembly and method for forming a frozen confection portion of a frozen confection food product.

2. Description of the Prior Art

Ice cream novelties are generally well known and may comprise ice cream, supported by a stick, cup, or tubular container, or a combination of ice cream and an edible container, or support, such as a cone, one or more cookies, cake, and the like.

In U.S. Pat. No. 6,156,357, issued Dec. 5, 2000, to Peter B. Franklin, there is shown and described one such product wherein an ice cream core is cradled in a U-shaped piece of cake. In products of this type it is customary to form the ice cream by freezing the ice cream in a mold, typically of stainless steel, and then removing the ice cream in frozen condition and combining the frozen ice cream with a support, either edible or non-edible.

Problems which have manifested themselves in this forming procedure include the fact that it is expensive and time-consuming to initially form solid, metal molds, and to continually sanitize them after each usage. Further, it is expensive to freeze the heavy, solid molds to create a frozen cavity in which to form the product. Further, removal of the frozen product from the mold can be problematic inasmuch as the frozen product is impinging upon the mold wall. The removal process typically requires the use of a stick, which is never removed from the product, making the process unusable for stickless, molded products. Still further, once the product is molded it must be placed into its final packaging configuration immediately, requiring the final assembly processes to be run at the same time the molding process is run. Because the molding and final assembly/packaging are linked, molding equipment is usually at or over capacity during summer months and underutilized during winter months, creating large industry inefficiencies.

There is thus a need for an assembly and method for forming frozen confection products which eliminate the aforementioned shortcomings of present systems.

SUMMARY OF THE INVENTION

Accordingly, an object of the present invention is to provide an assembly and method for forming a frozen confection product which do not require continual sanitizing of the molds, and the significant cost of reducing and keeping the molds at an appropriate freezing temperature. Further objects of the invention are to provide for easy handling and transporting of the formed product and to render removal of the frozen product from the mold a quick and easy undertaking without a stick. A still further object of the invention is to separate the molding and final assembly process, thereby extending the life span between formation of the product and safe and enjoyable consumption of the product.

With the above and other objects in view, a feature of the invention is the provision of an assembly for forming a frozen confection portion of a frozen confection type food product, the assembly comprising a mold casing of a selected configuration and of an inert material, a pump for moving confection into the mold casing to substantially fill the mold casing, sealing means for sealing the ends of the casing to provide a link of confection, a cutter device for separating links of molded confection, a freezing device for receiving and freezing the link, and apparatus for opening the casing of the link and permitting the frozen confection to exit out of the casing in the selected configuration.

In accordance with a further feature of the invention, there is provided a method for forming a frozen confection portion of a frozen confection type food product, the method comprising the steps of providing a mold casing of a selected configuration for a desired frozen confection, pumping the confection into the mold casing to substantially fill the mold casing, sealing ends of the casing to provide a link of confection, separating the link from adjoining links, removing the link from the mold cavity, freezing the link, and removing the link casing from the frozen confection.

The above and other features of the invention, including various novel details of combinations of parts and method steps, will now be more particularly described with reference to the accompanying drawings and pointed out in the claims. It will be understood that the particular assembly and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its' novel features and advantages will be apparent.

In the drawings.

DESCRIPTION OF THE PREFERRED EMBODIMENT

Figure 1:
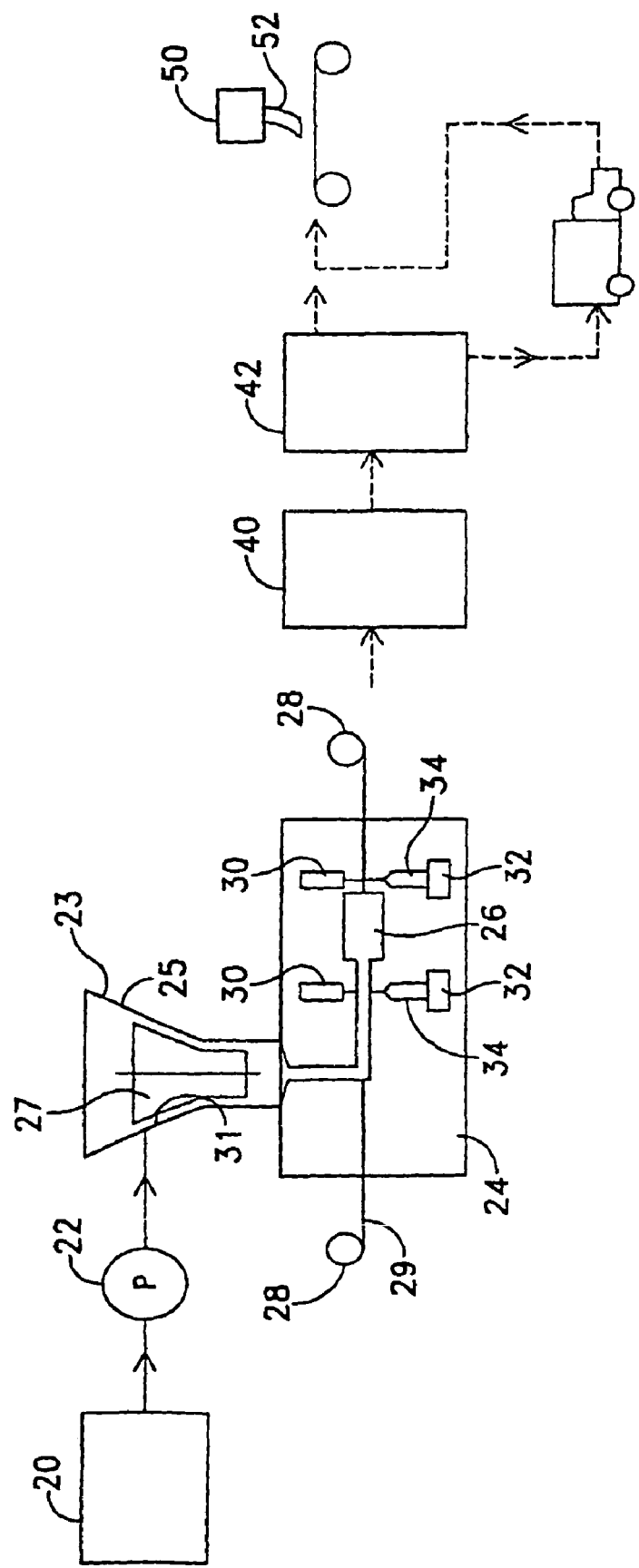
FIG. 1 is a diagrammatic illustration of one form of assembly illustrative of an embodiment of the invention.

Referring to FIG. 1, it will be seen that an illustrative assembly for forming a frozen confection for a frozen confection type food product, such as, for example, that shown and described in the aforementioned U.S. Pat. No. 6,156,357, includes an ice cream freezer 20, preferably a continuous batch freezer. It will be understood that use of the term "ice cream" herein is intended to include various frozen confections which might not be considered "ice cream" strictly speaking, such as frozen yogurt, frozen custard, sherbet, sorbet, other dairy and water-based products, and the like. The terms "ice cream" and "frozen confection" are used herein to denote frozen confections generally, just as various devices and products, such as "ice cream freezer" actually are not limited strictly to ice cream, but rather to frozen confections generally.

The ice cream freezer 20 may be provided with a pump (not shown) for moving a continuous batch of ice cream through the freezer. Movement of ice cream from the freezer 20 may be accomplished by the freezer pump and/or there may be provided a discrete pump 22. In either instance, the ice cream from the freezer 20 is pumped to a mold assembly 24 having therein a mold cavity 26 of a configuration selected for the particular product desired. Batch ice cream freezers are known in the art and are in use in the ice cream industry. In accordance with the present invention, the ice cream from the batch freezer 20 typically is pumped from the freezer in a partially frozen state.

The mold assembly 24 preferably is of the type made and sold by Vemag Corp. and identified as LPG 202 and ROBOT HP 10C (for medium-sized plants) and ROBOT HP 15C (for industrial-scale plants). These machines are intended for the sausage making industry, but have been found by the inventors herein to be suitable for molding frozen confection products. To adapt the sausage-making mold assembly to the forming of ice cream product, it is necessary only to modify solid-handling components to liquid-handling. For example, a "stuffer" portion 23 of the Vemag machine, which conveys sausage ingredients to the mold, is modified to handle a liquid, that is, the partially frozen mix provided by the freezer 20. The "stuffer" 23 typically constitutes a hopper 25 having a paddle-type scraper 27 therein for scraping the inner surface 31 of the hopper 25 and pushing meat into the mold. To handle the liquid ice cream, the paddle 27 is modified for closer contact with the hopper walls 31.

The freezer 20 provides the partially frozen mix at a temperature such that upon entering the mold 26 the mix is at a temperature of about 22° F.

The mold assembly 24 is provided with a casing feed 28 for moving an inert casing 29 into the mold cavity 26. The casing 29 preferably is of a natural material, or of a collagen or cellulose material. The casing feed 28 preferably is of the type used on the aforesaid Vemag sausage molding machine, in which the feed apparatus is used to advance casing material.

In a preferred embodiment, the mold cavity 26 is formed entirely by the flexible inert casing 29. In this case, the mold assembly 24 does not include the traditional mold with a mold cavity 26, but rather comprises merely support for the casing 29 which alone constitutes the mold cavity. In this embodiment, the size and shape of the mold cavity, and therefore the molded product, can easily be changed, even while the assembly is running. Further, multiple flavors can be extruded, including a molded core of one flavor and a surrounding layer of a second flavor.

The mold assembly is further provided with sealing means 30 for sealing the ends of the casing having therein the confection received from the batch freezer 20. The sealing means 30 thus forms a link of the confection housed in the casing 29. The sealing means 30 preferably comprises a selected one of (i) a twist-link device of the type commonly used in the aforementioned Vemay sausage mold assembly, (ii) a heat-seal device, and (iii) a tie device such as are commonly known in the arts, though believed not heretofore in the frozen confection forming arts.

Within the mold assembly 24, or proximate thereto, or remote therefrom, there is provided a cutter device 32 including a blade 34 for severing the casing material between formed bodies of confection to separate "links" of encased confection material from each other. The cutter device 32 preferably is of the type used in the aforesaid Vemag assembly.

The assembly further includes a nitrogen flash freezing apparatus 40 for lowering the temperature of the ice cream to about 5° F. Such apparatus 40 may be configured to accommodate throughput requirements and available floor space. Preferred devices include a nitrogen immersion freezer and a nitrogen freezing tunnel. An example of the former is a nitrogen immersion freezer of BOC Gases, and an example of the latter is a liquid nitrogen freezing tunnel of Air Products Food Group, both available through market channels.

The frozen product is then boxed and stored in a freezer 42 capable of further lowering the internal core temperature of the ice cream to at least about −20° F. At this point the product can be stored and/or transported to other locations.

Finally, the forming assembly includes an apparatus 50 for slicing open a link with a blade 52, which permits the frozen confection to fall out of, or otherwise exit, the casing 29. Such slicing apparatus is known and used in the preparation of skinless frankfurters. One appropriate apparatus is the Model 2600 Skinless Sausage Peeler of Townsend Engineering Company. The apparatus 50 may be disposed physically in the area of the assembly described hereinabove or may be disposed at remote location.

The assembly for forming a frozen confection is thus an assembly of essentially known components taken from various diverse industries, including ice cream making and quick freezing, and sausage making.

In operation of the above-described assembly, a continuous batch of ice cream is made by the ice cream freezer 20 and pumped into the casing cavity at about 22° F. The casing feed 28 will have disposed the casing 29 to line the mold cavity 26 or to serve as the mold cavity 26 itself. The ice cream is thus pumped into the casing 29 which in due course is filled with ice cream. The ends of the casing 29 adjacent the mold cavity 26 are closed by the sealing means 30, as by twisting, tying, or heat sealing, to produce a "link" of encased ice cream.

The encased link is then removed from the mold cavity 26 and directed to the flash freezing apparatus 40 for reducing the ice cream core internal temperature to about 5° F. The link is then boxed and stored in a storage freezer 42 to further reduce the temperature to at least about −20° F. The product may then be stored and/or shipped to another location.

After the ends of the casing are sealed to form an encased link of ice cream, the link may be separated from the adjoining links, as by the cutting blades 34. This step may be performed immediately after sealing the casing ends, or at some later point, including any point prior to removing the casing from the link, such as after storing and transporting the links.

When desired, either at the point of molding or a remote location, the link casing is cut open, as by the blade 52, permitting the frozen core to fall, or otherwise exit, the casing. Before the casing is cut, the link is allowed to rise to an outside temperature of 10° F., while the internal temperature remains at or below −20° F.

The frozen core is exposed to the environment only after it is removed from the casing. Accordingly, if the link is stored and/or shipped well before the casing removal operation, the start of shelf life is delayed for the time of storage and/or transport to market.

Inasmuch as the edible product, that is, the ice cream core, does not come in contact with the usual mold cavity, sanitizing a cavity is not required, and removal of the core from the casing cavity is no problem inasmuch as the core readily drops from the casing.

The above described assembly and method is much less expensive than the usual assembly and method for forming frozen dairy and water-based products, and is more mobile. The separation of the finished product production from the forming, or molding, process, facilitates enormous manufacturing location and scheduling flexibility. The molded product may be stored and/or shipped long-term and await later final processing.

Figure 2:
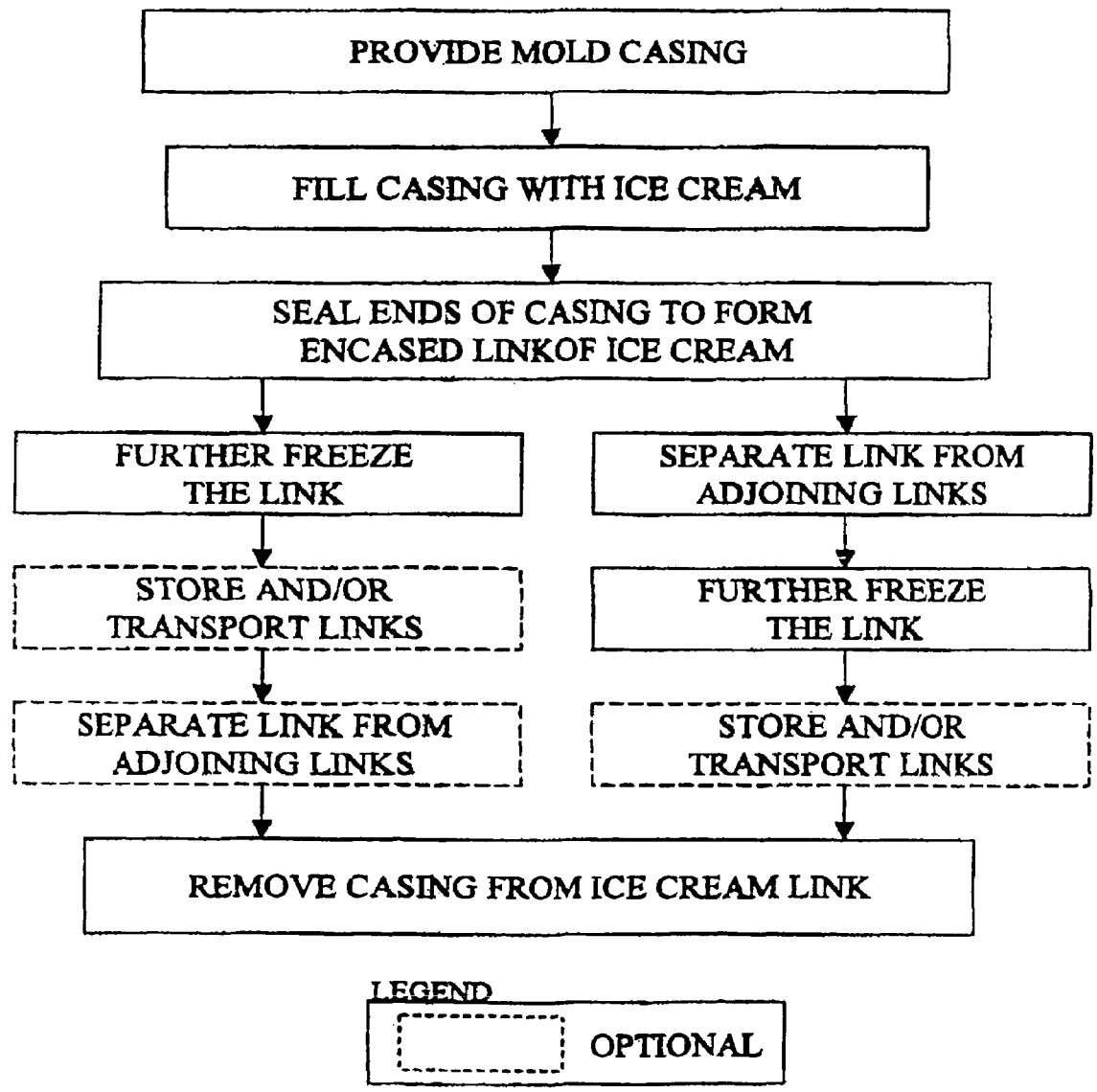
FIG. 2 is a block diagram showing an illustrative method in accordance with the invention.

As is shown in FIG. 2, the method is extremely flexible. Once the "further freeze" step has been accomplished, storing, transporting, and even separating the links can be accomplished as and when and where desired. In the "further freeze" condition, the ice cream cores can be stored for up to about two years, or so.

It will be understood that many additional changes in the details, materials, method steps and arrangement of components, which have been herein described and illustrated in order to explain the nature of the invention, may be made by those skilled in the art within the principles and scope of the invention as expressed in the appended claims.

What is claimed is:

1. An assembly for forming a frozen confection portion of a frozen confection type food product, the assembly comprising:
    a stuffer for receiving confection from a freezer, said stuffer comprising a funnel-shaped hopper having a paddle-type scraper rotatably mounted therein for pushing the confection out of the stuffer;
    a mold assembly provided with a mold casing of a selected configuration, the mold casing being formed by a flexible inert material;
    a pump for moving confection from the freezer into said stuffer, said stuffer being adapted to move confection into the mold casing to fill the mold casing;
    a twist-link device for closing ends of the mold casing to provide a link of confection;
    a cutter device for separating links of mold casing and molded confection;
    a freezing device for receiving and freezing the link; and
    apparatus for opening the casing of the link and permitting the frozen confection to exit out of the casing in the selected configuration.

2. The forming assembly in accordance with claim 1, wherein the freezer comprises a continuous batch confection freezer, said pump being operative to move partially frozen confection from the batch freezer to said stuffer.

3. The forming assembly in accordance with claim 1 wherein said mold assembly includes a casing feed for moving the inert casing into position to receive the confection from the freezer.

4. The forming assembly in accordance with claim 1 wherein said freezing device comprises a flash freezing device.

5. The forming assembly in accordance with claim 4 wherein said flash freezing device comprises a nitrogen freezing device.

6. The forming assembly in accordance with claim 5 wherein said nitrogen freezing device comprises a selected one of (i) a nitrogen immersion freezer, and (ii) a liquid nitrogen freezing tunnel.

7. The forming assembly in accordance with claim 1 wherein said apparatus for opening the casing comprises a slicing device for slicing open a link to permit the confection to exit the casing of the link.

8. An assembly for forming a frozen confection portion of a frozen confection type food product, the assembly comprising:
    an ice cream freezer for dispensing a batch of partially frozen confection material;
    a stuffer for receiving the partially frozen confection material, said stuffer comprising a funnel-shaped hopper having a paddle-type scraper rotatably mounted therein for pushing the partially frozen confection out of the stuffer,
    a mold assembly provided with a mold casing of a selected configuration for the desired frozen confection product, the mold casing being adapted to receive the partially frozen convection pushed from said stuffer;
    a mold casing feed associated with said mold assembly for positioning the mold casing such that the mold casing receives the confection material from the stuffer and expands until substantially filled; and
    a twist-link device for sealing ends of the filled mold casing to form a link of encased partially frozen confection.

9. The assembly in accordance with claim 8 and further comprising a freezing device for receiving the link and reducing the temperature thereof to further freeze the link.

10. The assembly in accordance with claim 9 and further comprising a storage freezer for receiving the link and for still further reducing the temperature of the link.

11. The assembly in accordance with claim 10 and further comprising a cutter device for opening the casing of the link to permit the ice cream in the link to exit the link.

12. A method for forming a frozen confection portion of a frozen confection type food product, the method comprising the steps of:
    providing a confection freezer for partially freezing and retaining a batch of confection in a partially frozen condition;
    providing a casing material forming a mold cavity casing of a selected configuration for a desired frozen confection;
    pumping the confection from the confection freezer into the mold cavity to substantially fill the mold cavity;
    sealing ends of the casing to provide a link of confection;
    separating the link from adjoining links; and
    freezing the link.

13. The method in accordance with claim 12 wherein the step of pumping the confection into the casing comprises flowing the confection from a confection freezer and into the casing at a temperature of about 22° F.

14. The method in accordance with claim 12 wherein the casing material comprises a material selected from (i) natural, (ii) collagen, and (iii) cellulose.

15. The method in accordance with claim 12 wherein the step of sealing the ends of the casing is accomplished by a selected one of (i) twisting the ends, and (ii) heat sealing the ends, and tying the ends.

16. The method in accordance with claim 12 wherein the step of freezing the link comprises flash freezing to a temperature of about 5° F.

17. The method in accordance with claim 16 wherein the step of flash freezing the link comprises freezing the link by a selected one of (i) nitrogen immersion, and (ii) a liquid nitrogen tunnel.

18. The method in accordance with claim 16 and further comprising the step of placing the link in a freezer-storage device to further reduce the temperature of the link to about −20° F.

19. The method in accordance with claim 12 and further comprising the step of removing the link casing by slicing open the casing and permitting the frozen confection to exit the casing.

20. A method for forming a frozen confection portion of a frozen confection type food product, the method comprising the steps of:
provide a confection freezer for partially freezing and retaining a batch of confection in a partially frozen condition;
providing a mold cavity of an inert casing material and of a selected configuration for a desired frozen confection;
pumping the partially frozen confection from the confection freezer into the mold cavity;
sealing ends of the casing to provide a link of encased partially frozen confection;
separating the link from adjoining links;
further freezing the link; and
removing the casing from the confection.

21. A method for forming a frozen confection portion of a frozen confection type food product, the method comprising the steps of:
providing a confection freezer for partially freezing and retaining a batch of confection in a partially frozen condition;
providing a mold assembly including a casing forming a mold cavity of a selected configuration for a desired frozen confection;
pumping the partially frozen confection from the confection freezer into the mold cavity;
sealing ends of the casing to provide a link of confection;
freezing the link; and
separating the link from adjoining links.

* * * * *